Dec. 27, 1960 P. L. REYNOLDS 2,966,376
SHAFT SEAL ASSEMBLY
Filed April 30, 1958
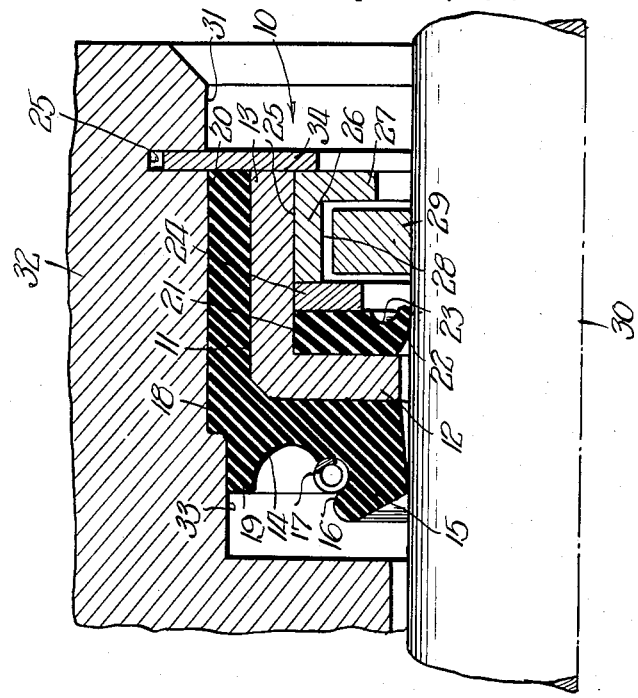
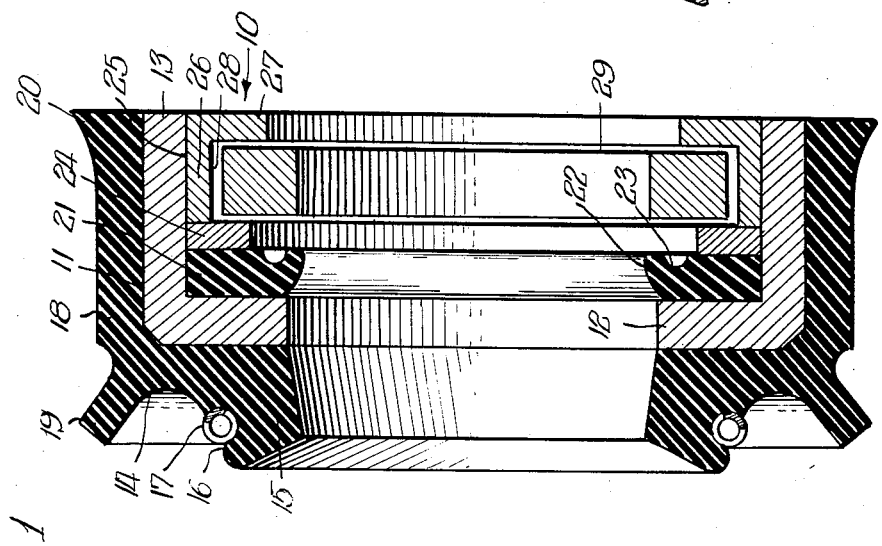
INVENTOR.
Percival L. Reynolds,
BY
Cromwell, Greist + Warden
Attys.

United States Patent Office

2,966,376
Patented Dec. 27, 1960

2,966,376

SHAFT SEAL ASSEMBLY

Percival L. Reynolds, Glenview, Ill., assignor to Chicago Rawhide Manufacturing Company, Chicago, Ill., a corporation of Illinois Filed Apr. 30, 1958, Ser. No. 732,006

6 Claims. (Cl. 288—3)

The present invention relates to a new and improved shaft seal assembly especially suited for use with reciprocal shafts or rods in high pressure installations. More specifically, the shaft seal assembly of the present invention includes a combination of elements providing for the sealing of a shaft to prevent loss of lubricant from the surrounding housing either along the bore or the shaft, entrance of dust or dirt to an extent that would interfere with proper functioning of the installation, and the formation or movement of ice or mud on or along the shaft which would interfere with the efficiency of the shaft sealing element of the assembly. The features described are incorporated in a single unit in a new and improved manner and cooperate to provide improved shaft sealing functioning particularly in high pressure installations.

The foregoing statements of the present invention set forth therein the objects and purposes with the principal object being to provide a single unit shaft seal assembly incorporating therein in an improved structural and cooperative operational relation a bore housing seal, a shaft seal, an installation dirt excluder in the form of a shaft engaging seal, and an improved form of shaft scraper seal. The recited combination is unitized in a compact and improved manner to not only perform the required functions of the assembly but also provide a compact assembly readily adapted for installation and field maintenance.

Other objects and purposes not specifically set forth will become apparent from the following detailed description made in conjunction with the drawing wherein:

Fig. 1 is a longitudinal sectional view of the new and improved seal of the present invention; and Fig. 2 is a fragmentary partly sectioned installational view in half section illustrating the seal in its operative association in the bore housing for a shaft.

The seal 10 of Fig. 1 includes a shell-type retainer 11 of ring-like configuration having an inwardly positioned radially extending wall 12 and an outwardly directed axially extending wall 13. Bonded to the outer surfaces of the walls is a sealing member 14 having a radially inwardly directed shaft sealing lip portion 15 carrying an annular spring retaining groove 16 which has received therein a continuous coil spring 17 for spring loading the sealing lip portion 15 for sealing engagement with a shaft. The sealing member 14 further includes an integrally formed, axially extending portion 18 bonded to the outer surface of the wall 13 and designed for compressed sealing engagement with the bore of a shaft housing.

The inner end portion of the sealing member 14 where the radially inwardly directed portion 15 and the axially directed portion 18 join has integrally formed therewith an axially inwardly and radially outwardly inclined sealing lip 19 designed for flexible sealing engagement with a stepped shoulder portion in the bore of the shaft housing to thus provide for complete OD sealing engagement with the bore of the shaft housing. The outer end portion of the axially extending portion 18 is provided with a radially outwardly extending flare lip 20 which is compressed in installation against the bore of the shaft housing as shown in Fig. 2.

The cooperating inner surfaces of the walls 12 and 13 of the retainer 11 define an axially outwardly opening area of annular shape which has received therein in the innermost portion thereof an annular dust excluder in the form of a flexible sealing member 21. This sealing member is provided with a radially inwardly extending lip 22 for engagement with a shaft and which is oppositely directed relative to the sealing lip portion 15 of the sealing member 14. An annular groove 23 is provided radially outwardly of the sealing lip 22 to provide thereto the requisite flexibility while it will be understood that the dust excluder 21 may be shaped or designed to carry a coil spring in the conventional manner as a provision against ineffectiveness of the seal following setting of the rubber material thereof over a relatively long period of continuous use.

Outwardly of the dust excluder 21 is a washer 24 received in the retainer 11 and in engagement with the outer face of the dust excluder 21. A shell-type retainer 25 completes the seal assembly internally of the retainer 11. The retainer 25 is provided with an axially inwardly directed wall 26 integrally formed with an outwardly positioned, radially inwardly directed wall 27. The inner end of the wall 26 is in confining abutment with the washer 24 which in turn is in confining abutment with the dust excluder 21. The dimensions of the various elements received within the retainer 11 are preferably such that the outer radial face of the wall 27 is in alignment with the outer end surfaces of the retainer 11 and sealing member 14.

The washer 24 and retainer 25 cooperatively define therebetween a radially inwardly opening cup-like recess 28 in which is loosely received a floating scraper element or member in the form of a ring 29. The scraper ring 29 may be formed from any suitable material, such as Phosphor-bronze, and the ID of the ring is such that the same will closely ride a shaft while the OD and axial thickness of the ring provide for a floating action of the same within the recess 28 defined by the washer 24 and retainer 25.

A typical high pressure installation utilizing the seal 10 of the present invention is illustrated in Fig. 2. A reciprocating shaft 30 is received within the bore 31 of a housing 32. The seal 10 is installed within the bore 31 in surrounding relation to the shaft 30 with the OD of the portion 18 of the sealing member 14 in compressed sealing engagement with the bore 31. The inner bore sealing lip 19 is deflected in compressed sealing engagement with a stepped surface 33 of the bore 31 to complete the OD seal of the assembly 10. The sealing lip portion 15 is in compressed sealing engagement with the OD of the shaft 30 and functions to prevent the loss of lubricant from the housing 32 outwardly along the shaft 30.

The sealing lip portion 22 of the dust excluder 21 is in outwardly directed sealing engagement with the shaft 30 to prevent the entry of dirt or dust along the shaft 30 into the housing 32 to an extent that the same might interfere with efficient sealing action of the sealing lip portion 15 or adversely affect the lubricating oil contained in the assembly. The scraper ring 29 closely hugs the shaft 30 and cleans the same during reciprocation thereof to prevent the forming or entry of ice or mud and the like into the housing 32. The assembly 10 is held in operative position within the bore 31 by a lock washer 34 which is fixed in a mounting groove 35 formed in the bore 31 and which extends radially inwardly in overlapping and locking relation with the outer end surfaces of the sealing member 14, wall 13 of the retainer 11 and wall 27 of the retainer 25. In this manner the entire assembly is fixedly held in the bore 31 of the housing 32 and the elements received within the retainer 11 are locked against axial displacement therefrom.

The washer 24 and retainer 25 cooperatively function to define a scraper ring retainer housing and, if desired, may be integrally formed as a one-piece unit. Preferably, the scraper ring 29 will have a shaft clearance of approximately 0.0005 of an inch while being freely received for floating action within the recess 28 to accommodate eccentric operation of the shaft 30 within the bore of the housing.

The seal assembly 10 combines in a single structure the several operative features described above without resorting to an assembly design which is overly complicated, expensive, or difficult to install or remove for field maintenance purposes. The innermost oil sealing lip portion 15 is fully protected within the bore 31 and is thus capable of efficient long life operation. The protective cooperative functioning of the various elements particularly adapts the assembly 10 for use in high pressure installations for sealing action relative to reciprocating shafts. The retainer 11 not only functions to define the axially outwardly opening area in which the dirt excluder and scraper member are mounted, but also functions to rigidify the resilient sealing member 14 to provide for efficient sealing action with both the bore 31 and the shaft 30.

Obviously certain modifications and variations of the invention as hereinbefore set forth may be made without departing from the spirit and scope thereof, and therefore only such limitations should be imposed as are indicated in the appended claims.

I claim:

1. A shaft seal particularly adapted for mounting in the bore of a housing relative to a reciprocating shaft, said seal including an annular sealing member of resilient material having a radially inwardly directed shaft sealing portion and an axially extending housing sealing portion joined with said shaft sealing portion and defining internally therewith an axially opening area, rigidifying means engaged with said sealing member to hold the same in sealing engagement with said shaft and said housing, an annular radially acting dust excluder shaft seal mounted in said area for engagement with said shaft, and an annular scraper element loosely mounted in said area for scraping engagement and eccentric movement with said shaft.

2. A shaft seal particularly adapted for mounting in the bore of a housing relative to a reciprocating shaft, said seal including an annular sealing member of resilient material having a radially inwardly directed shaft sealing portion and an axially extending housing sealing portion joined with said shaft sealing portion and defining internally therewith an axially opening area, rigidifying means engaged with said sealing member to hold the same in sealing engagement with said shaft and said housing, an annular radially acting dust excluder shaft seal removably mounted in said area for engagement with said shaft, an annular scraper element loosely mounted in said area for scraping engagement and eccentric movement with said shaft, said scraper element being in the form of a thick solid ring, and retainer means in said area to space and retain said dust excluder and scraper element 3. A shaft seal particularly adapted for mounting in the bore of a housing relative to a reciprocating shaft, said seal including an annular sealing member of resilient material having a radially inwardly directed shaft sealing portion and an axially extending housing sealing portion joined with said shaft sealing portion and defining therewith an axially opening area, rigidifying means engaged with said sealing member to hold the same in sealing engagement with said shaft and said housing, an annular radially acting dust excluder shaft seal mounted in said area for engagement with said shaft, a radially inwardly opening cup-shaped retainer mounted in said area engaging and holding said dust excluder shaft seal therein, and an annular scraper element freely mounted in said area for engagement and eccentric movement with said shaft.

4. A reciprocating shaft seal assembly including shell-like annular retainer for mounting in the bore of a housing about a shaft, said retainer having a radially inwardly directed wall and an axially directed wall for mounting in spaced relation to a shaft, the outer surfaces of said walls having bonded thereto a resilient sealing member with the axially extending portion thereof adapted for sealing engagement with said bore and the radially extending portion thereof provided with a radially acting shaft sealing lip, said retainer having mounted therein an annular resilient dust sealing member fixed adjacent the inner surface of said radially directed wall and having a sealing lip portion adapted for engagement with said shaft and axially oppositely directed relative to said shaft sealing lip, and a shaft scraper member received in said retainer adjacent said dust sealing member, said scraper member being loosely mounted in said retainer for engagement and eccentric movement with said shaft.

5. A reciprocating shaft seal assembly including a shell-like annular retainer for mounting in the bore of a housing about a shaft, said retainer having a radially inwardly directed wall and an axially directed wall for mounting in spaced relation to a shaft, the outer surfaces of said walls having bonded thereto a continuous resilient sealing member with the axially extending portion thereof adapted for sealing engagement with said bore and the radially extending portion being provided with a radially acting shaft sealing lip, said retainer having received therein an annular resilient dust sealing member in engagement with the inner surface of said radially directed wall and having a sealing lip portion adapted for engagement with said shaft and oppositely directed relative to said shaft sealing lip, a washer in said retainer in engagement with said dust sealing member to fixedly mount the same, a scraper member housing in said retainer in engagement with said washer, said scraper member housing and said washer defining therebetween an inwardly opening annular recess, and a scraper member loosely mounted in said recess for engagement and eccentric movement with said shaft.

6. The shaft seal assembly of claim 4 wherein said retainer is provided with means therein to fix said dust sealing member adjacent said radially directed wall and axially space said scraper member from said dust sealing member.

References Cited in the file of this patent

UNITED STATES PATENTS

| Re. 23,894 | Burkhard et al. | Nov. 9, 1954 |
| 1,725,593 | Mobley | Aug. 20, 1929 |
| 2,368,137 | Harmon | Jan. 30, 1945 |
| 2,644,701 | Flick | July 7, 1953 |
| 2,695,801 | Kosatka | Nov. 30, 1954 |
| 2,768,849 | Riesing | Oct. 30, 1956 |
| 2,833,577 | Reynolds | May 6, 1958 |

OTHER REFERENCES

Product Engineering, December 1948, page 51.
Product Engineering, January 1950, page 43.